Dec. 8, 1970     T. B. BULLOCK     3,546,570
METHOD FOR DRIVING CONTROLLED CURRENTS THROUGH THE STATOR
WINDINGS OF A POSITION MEASURING TRANSFORMER
Filed April 19, 1968

INVENTOR.
THOMAS B. BULLOCK,
BY Wolfe, Hubbard, Voit & Osann
ATTORNEYS.

United States Patent Office 3,546,570
Patented Dec. 8, 1970

3,546,570
METHOD FOR DRIVING CONTROLLED CURRENTS THROUGH THE STATOR WINDINGS OF A POSITION MEASURING TRANSFORMER
Thomas B. Bullock, Fond du Lac, Wis., assignor to Giddings & Lewis, Inc., Fond du Lac, Wis., a corporation of Wisconsin
Filed Apr. 19, 1968, Ser. No. 722,652
Int. Cl. G05f 1/12
U.S. Cl. 323—48
4 Claims

ABSTRACT OF THE DISCLOSURE

A pair of high gain amplifiers, each with negative current feedback, are used individually to drive a pair of stator windings of a position measuring transformer, sold under the trademark "Inductosyn," in response to a pair of voltages respectively representing the sine and cosine functions of a physical variable.

BACKGROUND AND OBJECTS OF THE INVENTION

The present invention relates to electromagnetic position measuring devices in general and more specifically to a method of operating a position measuring transformer of the type having conducting windings deposited on a pair of flat insulators.

Position measuring transformers, sold under the trademark "Inductosyn," are capable of very high accuracy and for that reason have been used in place of the rotary resolver in several applications. The resolver typically includes a stator having a pair of windings wound on an iron core and a rotor having a single winding on an iron core rotatable within the stator. When a pair of voltages $E_s$ and $E_c$ whose magnitudes are exactly proportional to the sine and cosine of a variable X are applied to the stator windings of the resolver, the resulting currents $I_s$ and $I_c$ create a magnetic field which induces a voltage in the rotor winding. For any given value of X the magnitude of the induced voltage varies sinusoidally with the angle between the stator and the rotor. The rotor position at which the induced voltage goes through a null varies with, and is determined by the ratio $I_s/I_c$, which in turn is equal to sin $X$/cos $X$, or tan X, provided the stator windings have equal impedances. Thus, with the voltages $E_s$ and $E_c$ accurately representing sin X and cos X, the rotor null position can be accurately shifted by changing the variable X.

The "Inductosyn" operates on a similar principle. It, too, has a "rotor" winding and a pair of "stator" windings. However, the "rotor" winding is a single coil in the form of a flat metallic ribbon deposited on a flat support member and the "stator" windings are a pair of such coils deposited on another flat support member as is well known for example, from U.S. Pat.s. 2,650,352; 2,671,892; and 2,799,835. The two support members, which may be either discs or scales, are juxtaposed so that the windings on them are magnetically coupled but the windings do not have iron or magnetic cores and, on the contrary, have non-magnetic supports such as glass. The "stator" windings are driven from a pair of voltages similar to those used to energize the resolver stator windings, and the magnitude of the voltage induced in the "rotor" winding is indicative of the relative positions of the two support members. In the case of both resolvers and Inductosyns it is essential that the ratio of the currents through the two windings or coils accurately reflect the ratio sin $X$/cos X where X is the variable referred to previously. With resolvers this is normally not a problem because the impedance of their stator windings is primarily inductive, and hence determined largely by the number of turns employed and not by the diameter of the wire used. Consequently, the stator windings of rotary resolvers are generally of uniform impedance and the currents drawn by them in response to a given input voltage do not vary from unit to unit.

Inductosyns differ in this respect. The impedance of their coils is primarily resistive due to non-magnetic supports and their resistance is subject to considerable unit-to-unit variation. Apparently, the process by which the Inductosyn windings are deposited on glass or other non-magnetic, electrically insulating supports results in sufficient variation in thickness to affect their input impedance. As a result of the non-uniformity in stator winding input impedance encountered with Inductosyns, it has been necessary in the past individually to pre-balance each Inductosyn with a pair of trimming resistors in conjunction with a pair of closely matched coupling transformers so that equal input voltages will cause equal currents to flow through the stator windings and, just as importantly, so that the ratio of the currents that flow through the stator windings always correspond exacly to the ratio of the input voltages, which in turn represents the ratio sin $X$/cos $X$. This procedure is time consuming and requires trained personnel. Furthermore, if the balancing is not made at the site where the Inductosyn is to be installed, careful attention must be paid afterward to the relative wire lengths between the two Inductosyn stator windings and their respective coupling transformers to prevent the previous balance from becoming upset.

Finally, because the impedance of an Inductosyn winding is primarily resistive, it is sensitive to a change in winding resistance, and there is a definite upper limit on the current that can be driven through the stator windings without introducing excessive error due to differential heating of, and resistance changes in, the windings. The reason for this type of error is that the amounts of current driven through the two stator windings of an Inductosyn, or of a resolver, are unequal for all but a unique value of the variable X for which sin $X$=cos $X$. In a resolver the change in the resistance due to heating is very little compared to the total impedance of the stator windings. But in an Inductosyn the effect can be pronounced at relatively high current levels. For this reason the Inductosyn must normally be driven at relatively low current levels. This in turn tends to reduce the output voltage available from the device.

It is therefore a principal object of the present invention to simplify the installation of an Inductosyn by eliminating the need to balance it prior to installation.

It is a related object of the invention to make an installed Inductosyn independent of the type and length of wire used to connect its stator coils to a source of current.

Yet another object of the invention is to increase the sensitivity obtainable from an Inductosyn by maintaining the magnitude of the currents through its stator windings independent of the resistance of those windings.

It is a further object of the invention to eliminate the need for matched coupling transformers for operating an Inductosyn.

Other objects and advantages will become apparent from the following discussion and from the accompanying drawings in which.

Figure 1:
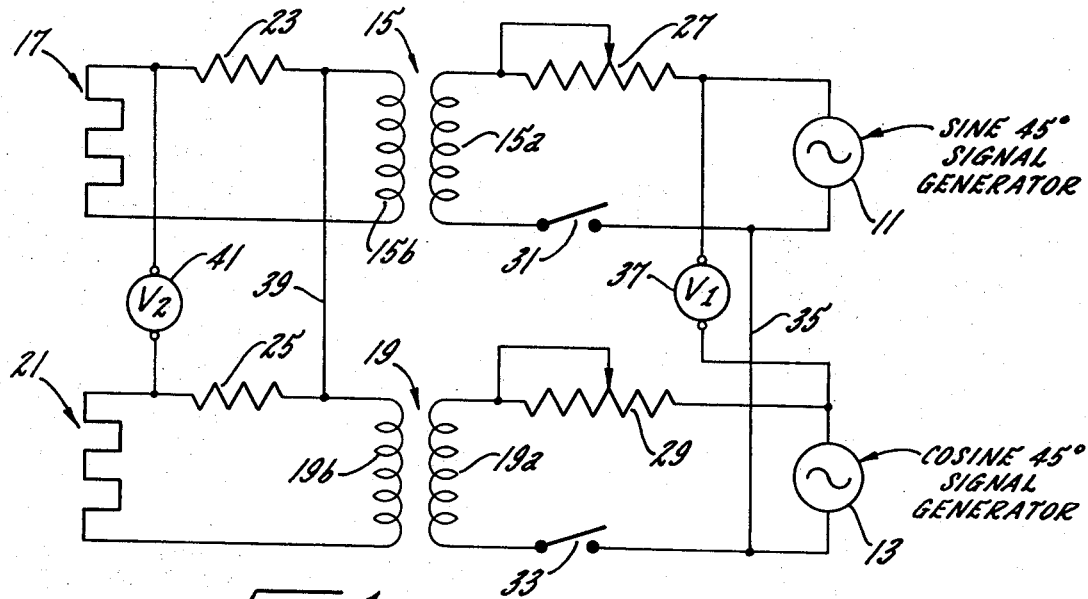
FIG. 1 is a circuit diagram showing the manner in which Inductosyns are calibrated prior to installation.

While the invention is susceptible to various modifications and alternative constructions, there is shown in the drawings and will be herein described in detail a preferred embodiment. It is to be understood, however, that it is not thereby intended to limit the invention to the specific form disclosed. On the contrary, it is intended to cover all modifications and alternative constructions falling within the spirit and scope of the invention expressed in the appended claims.

Referring specifically to the drawings, FIG. 1 illustrates a balancing procedure which is currently in use for setting up an Inductosyn. The equipment includes a pair of signal generators 11 and 13 for generating a pair of AC voltages of precisely equal magnitude. Through a pair of coupling transformers 15 and 19 the outputs of the generators 11 and 13 are individually coupled to respective ones of the stator windings 17 and 21. For reasons which will become apparent, the transformers 15 and 19 are closely matched.

In order to give an accurate indication of the currents flowing throuhg the stator coils 17 and 21, they are individually connected to the secondary windings 15b and 19b of their respective transformers 15 and 19 through precision one-ohm resistors 23 and 25. Finally, rheostats 27 and 29 are connected between the primary windings 15a and 19a of the transformers 15 and 19 and their respective generators 11 and 13 so as to permit the currents flowing through the coils 17 and 21 individually to be altered.

The first step in the balancing procedure is to make sure that the open circuit voltages produced by the generators 11 and 13 are precisely equal. Means for doing so are schematically shown in FIG. 1 as a pair of switches 31 and 33 connected between the generators 11 and 13, and their associated transformer primaries 15a and 19a. The generators 11 and 13 are connected together at one of their output terminals by means of a line 35, and a voltmeter 37 is connected between the other terminals of the generators. By means not shown, the output voltages of the generators 11 and 13 are adjusted until the voltage V1 registered by the voltmeter 37 is zero.

Next, the switches 31 and 33 are closed and the currents through the stator coils 17 and 21 are compared. This is done by connecting the precision resistors 23 and 25 at one of their ends through a line 39 and by placing a second voltmeter 41 between their opposite ends. Any voltage differential detected by the voltmeter 41 is an indication that the currents flowing into the windings 17 and 21 are unequal. This condition is eliminated by varying the settings of rheostats 27 and 29 until the voltage V2 detected by the voltmeter 41 is zero.

Finally, the precision resistors 23 and 25 are removed, and replaced by direct connections. Additionally, the wires 35 and 39 and the voltmeters 37 and 41 are also removed, as are the signal generators 11 and 13. The rest of the circuit, that is, the Inductosyn and its matched transformers 15 and 19, is ready for use. It is now apparent why the coupling transformers 15 and 19 must be closely matched to one another. If there were any difference between their turns ratios, removal of the identical resistors 23 and 25 would have an unequal effect on the currents flowing through the primary windings 15a and 19a, thereby also changing the relative magnitudes of the currents flowing through the Inductosyn stator windings 17 and 21.

Figure 2:
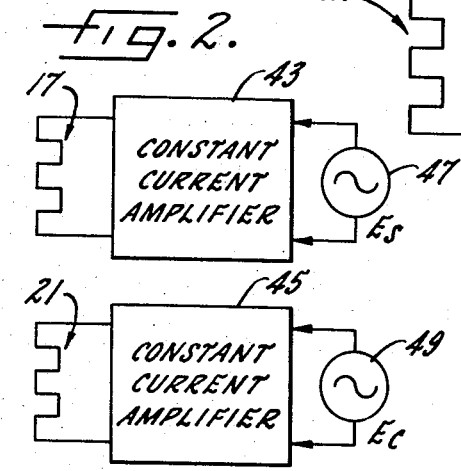
FIG. 2 is a block diagram illustrating the method of driving the stator windings of an Inductosyn in accordance with the present invention.

A method whereby all of the balancing procedure discussed with reference to FIG. 1 may be eliminated is indicated in FIG. 2. In accordance with this method, the respective stator windings 17 and 21 of an Inductosyn are individually, and directly driven by a pair of constant current amplifiers 43 and 45 in response to a pair of voltages $E_s$ and $E_c$, respectively representing the sine and cosine functions of a variable X. In FIG. 2 these voltages are shown to be produced by a pair of voltage generators 47 and 49. The constant current amplifiers 43 and 45 are operative to supply a current to their respective loads, the windings 17 and 21, which are precisely and directly proportional to the input voltages $E_s$ and $E_c$ respectively. Thus, the term "constant current amplifier" is used in the sense that, for a given input voltage $E_s$ or $E_c$ the amplifiers 43 and 45 will maintain constant the current which they drive through their respective loads 17 and 21, irrespective of any variations in the resistances or impedances of those loads. The only criterion that needs to be observed with the method of FIG. 2 is that the gains of the two amplifiers 43 and 45, that is, their output currents versus their input voltages, be exactly equal. It is well known to those skilled in the art that constant current amplifiers of the type required can be constructed simply by providing a high gain voltage amplifier with negative current feedback.

It is also well known that in constant current amplifiers having large negative current feedback, the output current versus input voltage gain becomes a function of passive circuit components such as resistors, and that, by using matched components in a pair of such amplifiers the amplifier gains may also be matched. A particularly suitable circuit of this type utilizing operational amplifiers is shown in FIG. 3.

Figure 3:
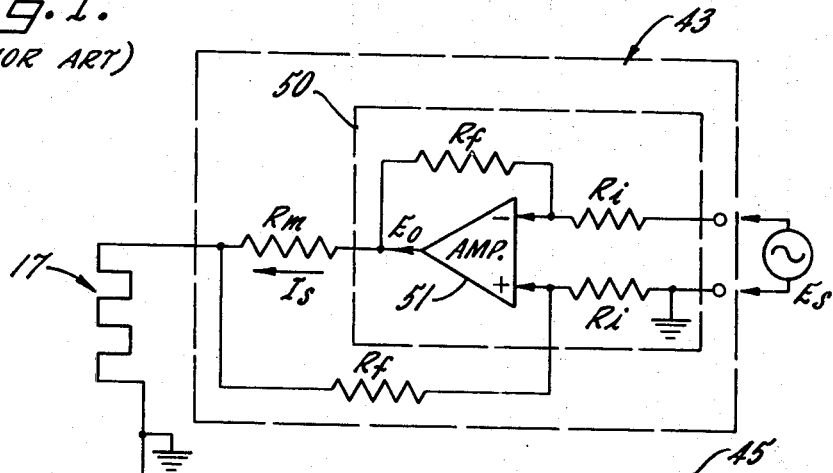
FIG. 3 is a circuit diagram illustrating a preferred circuit configuration to be used with the method illustrated in FIG. 2.

The circuit shown in FIG. 3 corresponds to that shown in block form in FIG. 2, in that a pair of input signals $E_s$ and $E_c$ control two constant current amplifiers 43 and 45 to drive currents through a pair of Inductosyn stator windings 17 and 21. Since the amplifiers 43 and 45 are identical only one of them, the amplifier 43, will be described. It includes a standard operational amplifier 50 comprising a high gain amplifier 51 having a plus (+) and a minus (−) input and a single output. The significance of the polarities ascribed to the inputs is that, when the + input of the amplifier 51 is driven in a positive direction the output of the amplifier is driven in the same direction. In contrast, a positive going input signal applied to the − input of the amplifier 51 causes its output to travel in a negative direction. The operational amplifier 50 includes a negative voltage feedback resistor $R_f$ connected between the output of the high gain amplifier 51 and its minus input. The input signal $E_s$ is applied across the + and − input terminals through a pair of input resistors, both labeled $R_1$, to indicate that their resistance values are the same.

In order to convert the standard operational amplifier 50 as described up to this point into a constant current amplifier, means are provided for introducing an additional feedback loop, which, by itself, is effective to apply positive voltage feedback to the amplifier 51, but which, in combination with the negative feedback loop, has the effect of applying negative current feedback to the amplifier. More specifically, a resistor $R_m$ is connected in series between the output of amplifier 51 and one end of the winding 17 whose other end is connected to ground. The junction point between the resistor $R_m$ and the winding 17 is connected to the + input of the amplifier 51 through a second feedback resistor which is also labeled $R_f$ to indicate that its resistance is the same as that of the negative feedback resistor $R_f$. It may be seen by inspection that the feedback voltage applied across the + and − inputs of the amplifier 51 will be equal to the voltage across the resistor $R_m$ and therefore will be directly proportional to the current $I_s$ flowing through that resistor. Since it may be assumed that the amount of current flowing through the positive feedback resistor $R_f$ to the + input of the amplifier 51 is negligible as compared to the current which flows through the winding 17 to ground, it is seen that the net amount of voltage feedback applied to the input of the amplifier 51 is directly proportional to the current that flows through the winding.

The leationship between the current I which may be assumed to be the current through the winding 17 and the input voltage $E_s$ can be shown to be $$\frac{I_s}{E_s} = \frac{R_f}{R_i \cdot R_m}$$

provided that it may be assumed that the currents flowing between, and the voltage existing across, the + and − inputs of the amplifier 51 are both zero. Due to the practically infinite gain of the amplifier 51, this assumption is justified. In a similar manner, based on the same assumption, it may be shown that the current $I_c$ driven through the other Inductosyn stator winding 21 by the second constant current amplifier 45 in response to an input $E_c$ thereto is $$\frac{I_c}{E_c} = \frac{R_f}{R_i \cdot R_m}$$

From the above equations it is apparent that the currents driven by the amplifiers 43 and 45 through the windings 17 and 21 are not functions of the resistance values of the coil, but are, instead, functions of the magnitudes of the resistors $R_f$, $R_i$ and $R_m$. Further, it may be seen that by matching the ratios $R_f/R_i$ of the two amplifiers 43 and 45 and by matching the values of their resistors $R_m$, the magnitude of the currents driven through the windings 17 and 21 in response to an input signal of a given magnitude can be set to be precisely equal for all values of input signals and regardless of any variations or disparities between the resistance values of the windings.

In practice, precise matching of current gains is achieved by purchasing four closely matched $R_f$ and $R_i$ resistors, two of each for each amplifier, and a pair of similarly matched $R_m$ resistors, one for each amplifier. Resistance tolerances of the order of .05% have been typical.

From the above description it is apparent that the invention here described represents a significant improvement in the manner of energizing, or driving, Inductosyns. By the use of a pair of amplifiers, whose size and weight can be made quite small by employing integrated circuits, the need to balance an Inductosyn, and to provide it with matched coupling transformers, has been eliminated. Moreover, by eliminating the effect of stator winding resistance upon stator winding current the Inductosyn may be driven at higher current levels than heretofore, since resistance variations due to $I^2R$ heating in the stator windings cannot diminish the current passing through them.

I claim as my invention:

1. A method of operating a position measuring transformer of the type having non-magnetic supports for its several windings which include a pair of stator windings having substantially pure resistive impedances without substantial inductive reactance, said method comprising the steps of driving one of said stator windings with a first negative current feedback amplifier in response to a voltage representative of the sine function of a variable and concurrently driving the other of said stator windings with a second negative current feedback amplifier, having the same input voltage vs. output current gain as that of said first amplifier, in response to a voltage representative of the cosine function of said variable, so as to eliminate the effect of stator winding impedance variations upon the accuracy of said position measuring transformer.

2. The method of driving the respective stator windings of a position measuring transformer, having non-magnetic winding supports such that the windings are of resistive impedance without substantial inductive reactance, directly with currents generated by individual high gain amplifiers having negative current feedback and adapted to receive two respective input voltages, the input voltage vs. output current gain characteristic of said amplifiers being identical.

3. A method of eliminating the effect of impedance variations in a pair of measuring transformer stator windings upon accuracy, said transformer having non-magnetic supports for its several windings which present substantially pure resistive impedances without substantial inductive reactance, said method comprising the driving of each of said pair of stator windings through an individual operational amplifier having positive as well as negative voltage feedback with the net negative feedback being proportional to the output current of the amplifier, respective ones of said amplifiers producing their output currents through the respective stator windings in response to analog voltages respectively representing the sine and cosine functions of a physical variable.

4. A method of operating a position measuring device of the type having non-magnetic supports for its several windings which include a pair of input windings with potentially unequal impedances, such impedances being almost purely resistive without substantial inductive reactance, said method comprising the steps of driving a current through one of said input windings by means of a first amplifier in response to a first variable-magnitude input voltage and concurrently driving a current through the other of said input windings by means of a second amplifier in response to a second variable-magnitude input voltage, said first and second amplifiers having equal and constant output-current versus input-voltage ratios.

References Cited

UNITED STATES PATENTS

| | | | |
|---|---|---|---|
| 2,740,935 | 4/1956 | Statsinger | 323—48 |
| 2,861,255 | 11/1958 | Mechler et al. | 340—198 X |
| 2,916,279 | 12/1959 | Stanton | 340—186 X |
| 3,011,119 | 11/1961 | Starks-Field et al. | 323—53 |

J D MILLER, Primary Examiner

A. D. PELLINEN, Assistant Examiner

U.S. Cl. X.R.

318—18; 323—53